(12) United States Patent
King

(10) Patent No.: US 11,600,032 B2
(45) Date of Patent: Mar. 7, 2023

(54) AUGMENTED REALITY SECURITY VULNERABILITY ASSISTANT

(71) Applicant: AT&T Intellectual Property I, L.P., Atlanta, GA (US)

(72) Inventor: Brianna King, Suwanee, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/246,171

(22) Filed: Apr. 30, 2021

(65) Prior Publication Data

US 2022/0351433 A1 Nov. 3, 2022

(51) Int. Cl.
  *G06T 11/60* (2006.01)
  *G06T 11/00* (2006.01)
  *G06V 20/20* (2022.01)

(52) U.S. Cl.
  CPC ............ *G06T 11/60* (2013.01); *G06T 11/001* (2013.01); *G06V 20/20* (2022.01)

(58) Field of Classification Search
  CPC .................................................. G06K 9/00671
  See application file for complete search history.

(56) References Cited

U.S. PATENT DOCUMENTS

2019/0379671 A1* 12/2019 Sundar .................... H04L 63/08
2021/0322877 A1* 10/2021 Chong .................. A63F 13/537

* cited by examiner

*Primary Examiner* — Samantha (Yuehan) Wang
(74) *Attorney, Agent, or Firm* — Hartman & Citrin LLC

(57) ABSTRACT

Concepts and technologies are disclosed herein for identifying vulnerabilities associated with a premises and generating and/or presenting augmented reality display data to aid in selecting security components to protect the vulnerabilities identified. A processor can execute a security vulnerability assistant service. A request from a user device can be received. The request can comprise image data of a premises. An object captured by the image data can be identified, and a determination can be made whether the object is associated with a vulnerability. In response to determining that the object is associated with a vulnerability, augmented reality display data can be generated. The augmented reality display data can include a virtual object for overlaying on an image of the object presented by the user device.

18 Claims, 9 Drawing Sheets

AUGMENTED REALITY SECURITY VULNERABILITY ASSISTANT

BACKGROUND

Traditionally, users have had to trust professional security system companies to select and install security systems to protect their homes and businesses. More and more, though, users are opting not to involve professional security system companies for their security needs and are instead selecting self-installation security options. However, with self-installation security options, users must rely on intuition and/or recommendations from the company selling the self-installation security systems to determine which security system components to purchase and where to install them, which can introduce user and advertiser biases without necessarily prioritizing achieving the most secure solution with only the security components needed. For example, the company selling the self-installation security systems may recommend more security components than are actually needed to provide a secure solution for a user's home. These excess security components create unnecessary load on a user's wireless local area network, which can interfere with communications from necessary security components and cause missed security alerts. Visually and conceptually understanding the vulnerabilities that exist within a premises, like a home or business, may allow a user to select more accurately and install the security components needed for optimal protection while also reducing the burden on a user's wireless local area network.

SUMMARY

The present disclosure is directed to identifying vulnerabilities associated with a premises and generating and/or presenting augmented reality display data to aid in identifying the vulnerabilities and selecting security components to protect the vulnerabilities identified. According to some embodiments of the concepts and technologies described herein, a server computer can execute a security vulnerability assistant service, and a user device can execute a security application. In some other embodiments, one of the user device and/or the server computer can execute functionality associated with both the security application and the security vulnerability assistant service.

According to embodiments, a request from a user device can be received by the server computer. The request can comprise image data of a premises. An object captured by the image data can be identified by the server computer, and a determination can be made whether the object is associated with a vulnerability. In response to determining that the object is associated with a vulnerability, the server computer can generate augmented reality display data. The augmented reality display data can include one or more virtual objects for overlaying on an image of the object presented by the user device. An augmented reality algorithm that provides augmented reality-related processing such as object detection, feature extraction, object recognition, template matching, and/or combinations thereof can be implemented by the server computer to identify an object of the image data, determine a vulnerability associated with the object, and generate computer data including virtual objects based on the image data. According to some embodiments, machine learning and deep learning are integrated into the augmented reality-related processing provided by the augmented reality security module to facilitate object detection and recognition of the objects of the premises captured by the image data as well to facilitate identification of vulnerabilities associated with the objects. For instance, a neural network or deep neural network may be implemented to accomplish the object detection, recognition, and vulnerability identification associated with the image data. According to embodiments, the augmented reality display data can be provided to the user device.

According to further embodiments, the security application executing on the user device can be launched or otherwise initiated. The user device, via execution of the security application, can provide a live view of a physical, real-world environment, which can include a premises. The premises can be any location, building, structure, property, grounds, or the like for which a user would like to install a security system and/or upgrade/supplement an existing security system. The user device, via execution of the security application, can also be configured to obtain user data including one or more of orientation data, existing security system information, known vulnerabilities/incidents data associated with the premises, other data, combinations thereof, or the like. The user device can generate a request and provide the request to the server computer. The request can include the image data. The request can also include the user data.

According to embodiments, the user device receives, from the server computer, augmented reality display data generated based on the data of the request. According to embodiments, the augmented reality display data can include an augmented reality security assistant display, security options, and an alert. One or more of the augmented reality security assistant display, the security options, and/or the alert can include virtual objects that can be overlaid on a real-time image presented by the user device.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
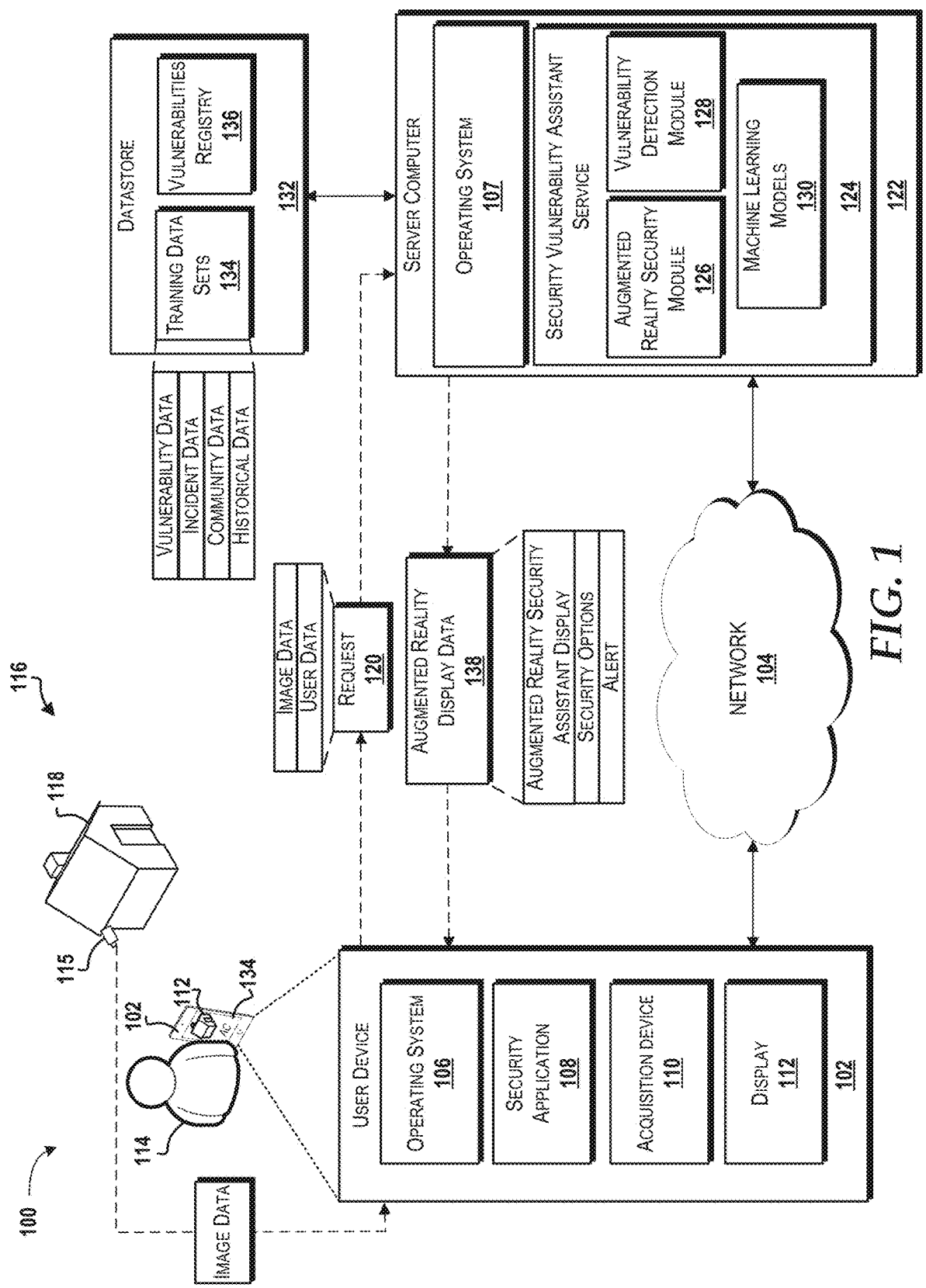
FIG. 1 is a system diagram illustrating an illustrative operating environment for various embodiments of the concepts and technologies described herein.

The following detailed description is directed to identifying vulnerabilities associated with a premises and generating and/or presenting augmented reality display data to aid in selecting security components to protect the vulnerabilities identified. "Augmented reality" is used herein to describe a computing concept in which at least a portion of a physical, real-world environment is augmented to include computer-generated data that is presented as an overlay of and/or spatially integrated with content on a display. The computer-generated data can include virtual objects that are presented over and/or spatially integrated with real-world objects of the physical, real-world environment through presentation on a display. The virtual objects can include text, colors, patterns, gradients, graphics, other images, videos, animations, combinations thereof, and the like. Computer-generated data that augments in some manner a view of a physical, real-world environment and/or elements thereof is referred to herein generally as "augmentation" (or variants thereof, such as "augmenting").

According to some embodiments of the concepts and technologies described herein, a user device can execute a security application, and a server computer can execute a security vulnerability assistant service. The user device can be used to capture, via an acquisition device, images of a real-world environment. Images of the real-world environment may also, or alternatively, be captured by an existing security camera surveilling the environment. According to embodiments, the real-world environment includes a premises. The premises can be any location, building, structure, property, grounds, or the like for which a user would like to install a security system and/or upgrade/supplement an existing security system. The user device can generate a request for augmented reality display data. The request can include image data corresponding to the images captured of the premises. The request can also include user data. According to some embodiments, the user data can include orientation data of the user device and/or the security camera that captured the images. The user data can also include security system data regarding any existing security system associated with the premises. Additionally, the user data can include known vulnerabilities and/or incident data including one or more vulnerabilities associated with the premises determined by the user and/or incidents associated with the premises. The user device can transmit the request to the security vulnerability assistant service, in some embodiments. The security application can provide the functionality illustrated and described herein for capturing image data and generating a request.

The security vulnerability assistant service can analyze the image data of the request to identify one or more objects of the premises captured by the images, detect any vulnerabilities associated with the objects, and generate augmented reality display data including security options based on the vulnerabilities detected. The one or more objects can include doors, windows, fences, garage doors, pet doors, vehicles, storage buildings, stairways, decks, patios, walls, roofs, chimneys, trees, bushes, and/or any other structures of the premises. The security vulnerability assistant service can include an augmented reality security module that can implement an augmented reality algorithm that provides augmented reality-related processing such as object detection, feature extraction, object recognition, template matching, and/or combinations thereof to identify objects of the image data and generate computer data including virtual objects based on the image data. According to some embodiments, machine learning and deep learning are integrated into the augmented reality-related processing provided by the augmented reality security module to facilitate object detection and recognition of the objects of the premises captured by the image data as well as to facilitate identification of vulnerabilities associated with the objects. For instance, a neural network or deep neural network may be implemented to accomplish the object detection, recognition, and vulnerability identification associated with the image data.

The security vulnerability assistant service can also include a vulnerability detection module to detect whether one or more of the objects identified by the augmented reality security module is associated with a vulnerability. According to embodiments, vulnerabilities include any weakness associated with an object that makes it susceptible to intrusion by an unwanted party. Such weaknesses can include whether the object is an entry point and if so the type of entry point, location of the object, condition of the object, existing security components associated with the object, and the like. The vulnerability detection module can use machine learning models created based on one or more machine learning algorithms to determine whether an identified object is associated with a vulnerability. The vulnerability detection module can also use the machine learning models to determine a severity rating associated with a particular vulnerability. The machine learning models are trained using training data sets, according to embodiments, that define what constitutes a vulnerability, a severity of a particular vulnerability, and security options for reducing the vulnerability. Training data in the training data sets can include vulnerability data, incident data, community data, and historical data.

The security vulnerability assistant service can generate augmented reality display data and provide the augmented reality display data to the user device for presentation at the user device. The user device can present one or more displays at the user device including the augmented reality display data. The augmented reality display data can be generated based, at least in part, on one or more of the objects detected, the vulnerability associated with the object, the severity rating of the vulnerability, and security options for reducing the vulnerability of the object. According to embodiments, the augmented reality display data can include an augmented reality security assistant display including one or more virtual objects generated by the security vulnerability assistant service. The virtual objects can be overlaid on an image of a display presented by the user device to highlight the object determined to be associated with a vulnerability. This highlight can indicate that a security component should be installed or be used to monitor the object. The augmented reality display data can also include an alert. The displays can present the alert including a severity rating of the vulnerability. The augmented reality display data can additionally include security options, and the displays can provide the security options for reducing the vulnerability of the object. Thus, embodiments of the concepts and technologies described herein can be used to identify vulnerabilities associated with a premises and allow a user to select more accurately and install security components needed for optimal protection of the premises.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for identifying vulnerabilities associated with a premises, generating augmented reality display data, and presenting displays including the augmented reality display data to aid in selecting security components to protect the vulnerabilities identified will be described, according to an illustrative embodiment. The operating environment 100 shown in FIG. 1 includes a user device 102. In some embodiments, the user device 102 can operate in communication with and/or as part of a communications network ("network") 104. It should be understood, however, that the user device 102 also can provide some of the functionality described herein without communicating via the network 104.

According to various embodiments, the functionality of the user device 102 may be provided by one or more server computers, personal digital assistants ("PDAs"), tablet computers, slate computers, smart watches, smart glasses (e.g., the GOOGLE GLASS family of products), mobile media devices, mobile telephones, laptop computers, smartphones, a wearable computing device, a heads-up display computer system, a vehicle computing system, an attachable computing device, a camera, an appliance (e.g., a refrigerator, an oven, a microwave, etc.), a television, a handheld device, a mirror, a window, other computing systems, and the like that can implement augmentation to view on a display or substrate (e.g., a piece of glass). It is understood that the examples discussed above are used for illustration purposes only, and therefore should not be construed to limit the scope of the disclosure in any way. It should be understood that the functionality of the user device 102 can be provided by a single device, by two similar devices, and/or by two or more dissimilar devices. For purposes of describing the concepts and technologies disclosed herein, the user device 102 is described herein as a smartphone. It should be understood that this embodiment is illustrative, and should not be construed as being limiting in any way.

The user device 102 can execute an operating system 106, one or more application programs such as, for example, a security application 108, and one or more other application programs (not shown in FIG. 1). The operating system 106 is a computer program for controlling the operation of the user device 102. The application programs and/or the security application 108 can include executable programs configured to execute on top of the operating system 106 to provide various functions illustrated and described herein for providing, generating, presenting, obtaining data for, and/or using augmented reality security assistant displays. In some embodiments, the application programs can include, but are not limited to, web browsers, web applications, mail applications, native applications, media applications, camera and/or video applications, combinations thereof, or the like. Because various embodiments of application programs are generally known, the application programs are not described in additional detail herein.

In some embodiments, a user 114 of the user device 102 can launch or otherwise initiate the security application 108. For example, the user 114 may launch the security application 108 in order to use the security application 108 to help determine where to install components of a security system to secure a premises, such as the premises 118, and what components to select. It is understood that the security application 108 may not necessarily be intended only for providing the concepts and technologies disclosed herein, but rather can be configured as a social media application, an electronic commerce application, a video conference application, an educational application, or other applications that may implement augmented reality. In some embodiments, the user device 102 can include an acquisition device 110 for capturing image data and a display 112 for presenting the image data. It is understood that the embodiments above are for illustration purposes only, and should not be construed as being limiting in any way.

In some embodiments, the user device 102, via execution of the security application 108, can provide a live view of a physical, real-world environment 116. In these embodiments, the user device 102 may utilize the acquisition device 110 (e.g., an image system 732 and/or video system 734 shown in FIG. 7) to capture a live view of the physical, real-world environment 116, which can then be presented to the user 114 via the display 112 of the user device 102. For example, the user 114 can launch the security application 108, which in turn can activate the acquisition device 110 to capture a live view of the real-world environment 116. According to embodiments, the security application 108 can be configured to instruct a user, such as the user 114, to use the user device 102 to scan the premises 118 for which the user 114 would like to install a security system and/or upgrade/supplement an existing security system. The premises 118 can be any location, building, structure, property, grounds, or the like for which the user 114 would like to install a security system and/or upgrade/supplement an existing security system. At least a portion of the premises 118 can be presented on the display 112 of the user device 102 as image data that, as described further herein, can be used for augmentation. In some embodiments, a view of the physical, real-world environment 116 can be provided by a surveillance camera 115 of, for example, an existing security system associated with the premises 118. The security application 108 and/or the security vulnerability assistant service 124 may expose an application programming interface (API) allowing an existing security system of the premises 118 to provide images, video feeds, or any other data to the security application 108 and/or the security vulnerability assistant service 124. In other embodiments, the user device 102 can provide a non-live view of a physical, real-world environment. In these embodiments, the non-live view can present a physical, real-world and/or virtual environment as a virtual reality that allows for multi-dimensional engagement with an image, such as providing a three-hundred and sixty-degree image or video of the non-live view. Accordingly, a reality that is to be augmented need not be a present reality and can instead be a past reality, encapsulated in a photograph, a map, a virtual environment, or the like, that is augmented at a later time such as the present.

The user device 102, via execution of the security application 108, can also be configured to obtain user data to provide various functionality illustrated and described herein. According to various embodiments, the security application 108 can support interactions for obtaining user data. For example, the security application 108 can present one or more displays via the user device 102 to receive the user data. According to various embodiments, the user data can include one or more of orientation data, existing security system information, known vulnerabilities/incidents data associated with the premises 118 known by the user 114, other data (not illustrated separately in FIG. 1), combinations thereof, or the like. The orientation data can represent the orientation of the user device 102 at any particular moment. Thus, the orientation data can be obtained from one or more sensors such as accelerometers, location determination devices (e.g., global positioning system ("GPS") receivers, or the like), magnetometers, gyroscopes, location and/or orientation sensors or sensor arrays, combinations thereof, or the like. The orientation data also can include location data that can identify a geographic location. Thus, the orientation data can represent not only where the user device 102 is (e.g., a geographic location), but also how the user device 102 is oriented (e.g., a facing direction, an angle of incline, or the like), as well as movements of the user device 102. This information may be used to generate augmented reality security assistant displays from the current point of view of the user device 102 and/or for other purposes as illustrated and described herein.

The existing security system data can include specifications, settings, options, and/or other information about an existing security system and/or existing security system components associated with the premises 118. In various embodiments, the existing security system data can specify a brand of the existing security system, types of components of the existing security system in use at the premises 118 (e.g., motion sensors, indoor and outdoor cameras, glass break detectors, door and window sensors, smoke detectors, carbon monoxide detectors), and specifications, settings, and options corresponding to the components. The user device 102 can obtain the existing security system data from the user 114. Alternatively, or in addition, the user device 102 can obtain the existing security system data from a controller or other component of the existing security system. This information may be used to generate augmented reality security assistant displays and security options as illustrated and described herein.

The known vulnerabilities and/or incident data can include information about any security weaknesses of the premises 118 that are known by the user 114. For example, the user 114 may provide information to the user device 102 about broken/missing locks and/or broken/cracked windows at the premises 118 that the user is aware of and which could pose security issues. The known vulnerabilities and/or incident data can also include information about any occurrences of intrusion by an unwanted party at the premises 118. For example, the user 114 may provide information to the user device 102 about any burglaries or attempted burglaries at the premises 118, animal invasions, trespassing, or any other types of intrusions that have occurred at the premises 118. This information may be used to generate augmented reality security assistant displays and security options as illustrated and described herein.

The user device 102, via execution of the security application 108, can generate a request 120 for augmented reality display data. The request 120 can include the image data captured by the acquisition device 110. According to some embodiments, the request 120 can also include the various data included in the user data. According to various embodiments, including the embodiment shown in FIG. 1, the security application 108 can communicate with a security vulnerability assistant service 124 or other software that may be hosted or executed by a computing device. In the illustrated embodiment, the security vulnerability assistant service 124 can be a callable service that may be hosted by a server computer 122 that can execute an operating system 107. Because the security vulnerability assistant service 124 can be invoked, accessed, and/or interacted with in manners other than service calls or the like, it should be understood that the functionality of the server computer 122 may be provided by other computing devices such as laptop computers, workstations, web servers, combinations thereof, or the like. As such, it should be understood that this example is illustrative and therefore should not be construed as being limiting in any way.

The security vulnerability assistant service 124 can be configured to obtain the request 120 from the user device 102 and to use the data of the request 120 to provide various functionality illustrated and described herein. The security vulnerability assistant service 124 can analyze the image data of the request 120 to identify one or more objects of the premises 118 captured by the images. The one or more objects of the premises 118 can include doors, windows, fences, garage doors, pet doors, vehicles, storage buildings, stairways, decks, patios, walls, roofs, chimneys, trees, bushes, and/or any other structures of the premises. The security vulnerability assistant service 124 can include an augmented reality security module 126 that can implement an augmented reality algorithm that provides augmented reality-related processing such as object detection, feature extraction, object recognition, template matching, and/or combinations thereof to identify objects of the image data and generate computer data including virtual objects based on the image data. According to some embodiments, machine learning and deep learning are integrated into the augmented reality-related processing provided by the augmented reality security module 126 to facilitate object detection and recognition of the objects of the premises 118 captured by the image data as well as to facilitate identification of vulnerabilities associated with the objects. For instance, a neural network or deep neural network may be implemented to accomplish the object detection, recognition, and vulnerability identification associated with the image data.

The security vulnerability assistant service 124 can also include a vulnerability detection module 128 to determine whether one or more of the objects identified by the augmented reality security module 126 is associated with a vulnerability. According to embodiments, a vulnerability can include any weakness associated with an object that makes it susceptible to intrusion by an unwanted party. According to other embodiments, a vulnerability may include a violation of any code, standard, and/or regulation associated with an object such as, for example, a housing or building code.

Whether or not an object is associated with a vulnerability that makes it susceptible to intrusion by an unwanted party can be based on one or more of whether the object is an entry point to the premises 118 and if so the type of entry point, a location of the object, a condition of the object, any existing security components associated with the object, and the like. For instance, points of entry, such as doors, windows, pet doors, garage doors, fence gates, and the like, to a premises, such as the premises 118, may be defined as being associated with a vulnerability. Alternatively, points of entry may have to be located on a lower level of the premises 118 in order to be defined as being associated with one or more vulnerabilities, or only certain types of points of entry, such as sliding glass doors or pet doors, may be defined as being associated with one or more vulnerabilities. Additionally, a condition of the object such as, for example, a broken fence gate, may be defined as being associated with one or more vulnerabilities. For example, one of the objects identified in the image data of the request 120 may be a window of a house. Object recognition processing performed by the augmented reality security module 126 may determine that the window is located at a basement level of the house, that the window includes a crack in a top pane, and/or that the window does not have an existing security component that is visible from the image data. Based on this information, the security vulnerability assistant service 124 can determine that the object (i.e., the basement window) is associated with one or more vulnerabilities. If an object identified from the image data received from the user device 102 is determined to be associated with a vulnerability, the augmented reality security module 126 can generate an augmented reality security assistant display that includes computer data including virtual objects that, when overlaid on an image displayed by the user device 102, align with the identified object determined to be associated with the vulnerability in order to highlight or otherwise emphasize the identified object as one for which a security component should be installed or used to monitor.

The vulnerability detection module 128 can use machine learning models 130 created based on one or more machine learning algorithms to determine what constitutes a vulnerability and whether an identified object is associated with a vulnerability. According to embodiments, the machine learning models 130 can be built using a logistic regression model to predict the probability of an outcome (e.g., an intrusion) based on different factors in combination with the image data. As an example, if the logistic regression model finds that the probability of an intrusion associated with an identified object is 0.8, this may increase the vulnerability rating for the identified object. Other machine learning algorithms that can be used to create the machine learning models 130 are discussed with regards to FIG. 8.

The vulnerability detection module 128 can also use the machine learning models 130 to determine a severity rating associated with a particular vulnerability (e.g., scale of 1-3 with 1 being a lowest level of vulnerability and 3 being a highest level of vulnerability). According to embodiments, the severity rating associated with a particular vulnerability of an object may be based on a location of the object at the premises, a condition of the object, any existing security components associated with the object, and the like. Additionally, the severity rating may be based on vulnerability data, incident data, community data, and historical data, which will be described further below, related to the particular vulnerability of the object. For instance, if community data for a neighborhood where a premises, such as the premises 118, is located includes reports of break-ins through basement windows covered by bushes or trees, a window at the premises 118 partially covered by a bush would get a higher severity rating than a fully-exposed window at the premises 118 located on the second floor. In addition, the vulnerability detection module 128 can use the machine learning models 130 to determine one or more security component options to recommend for reducing a particular vulnerability. According to some embodiments, the vulnerability detection module 128 can also use the user data to aid in determining whether an identified object is associated with a vulnerability. According to some embodiments, the vulnerability detection module 128 can use the machine learning models 130 to determine what security component options could be used to reduce a particular vulnerability.

Figure 8:
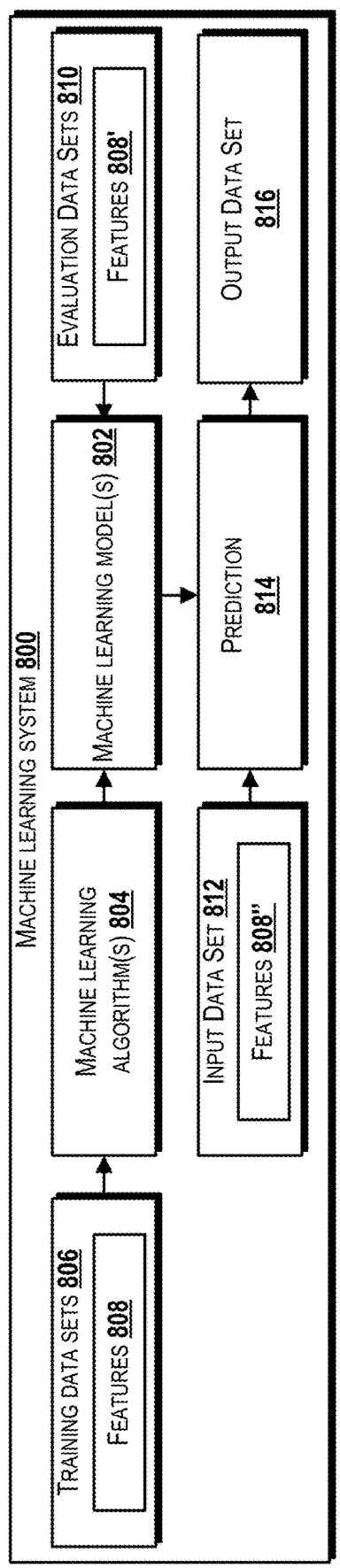
FIG. 8 is a block diagram illustrating an example machine learning system capable of implementing aspects of the embodiments presented herein.

The machine learning models 130 can be trained by a machine learning system, such as via an example machine learning system 800 illustrated and described herein with reference to FIG. 8, using training data sets 134 that define what constitutes a vulnerability, a severity of a particular vulnerability, and/or a security component option for reducing the vulnerability. Performance by the machine learning models 130 can also be evaluated using evaluation data sets, such as evaluation data sets 810 discussed below with reference to FIG. 8, which include the same factors as those of the training data sets 134 in order to ensure that the performance of the machine learning models 130 is adequate. The machine learning system 800 can be implemented as part of the server computer 122 or separate from the server computer 122. For example, the machine learning system 800 can train and test the machine learning models 130, and the server computer 122 can execute the machine learning models 130. Training data in the training data sets 134 can include vulnerability data, incident data, community data, and historical data. According to embodiments, the vulnerability, incident, community, and historical data can include, but should not be limited to, information about vulnerabilities identified by others, such as other owners/leasers of premises within and/or outside of the geographic location of the user device 102, security system professionals, building inspectors, exterminators, and the like; information about incidents, such as burglaries, trespasses, and animal invasions, experienced and/or reported by others within and/or outside of the geographic location of the user device 102; security component options selected by others; combinations thereof; and the like. According to embodiments, the vulnerability detection module 128 can determine whether the object is associated with a vulnerability that meets at least one definition of a vulnerability as established by the machine learning models 130. Vulnerabilities determined by the vulnerability detection module 128 can be stored in a vulnerabilities registry 136, which can be updated as new vulnerabilities are determined. According to some embodiments, the vulnerabilities registry 136 can also store, in relationship with each vulnerability, one or more security options determined to reduce a particular vulnerability. The vulnerability detection module 128 may also use the vulnerabilities registry 136 to determine whether an object is associated with a vulnerability stored in the vulnerabilities registry 136. The training data sets 134, the evaluation data sets 810, and/or the vulnerabilities registry 136 can be stored at the server computer 122, at a datastore 132 that is accessible by the server computer 122, or distributed among a plurality of server computers.

The security vulnerability assistant service 124 can be configured to analyze the image data and the user data of the request 120 to generate augmented reality display data 138 and transmit or otherwise provide the augmented reality display data 138 to the user device 102 for presentation at the user device 102. The user device 102 can present one or more displays at the user device 102 including the augmented reality display data 138, as will be discussed further below with regards to FIGS. 2A and 2B. The augmented reality display data 138 can be generated based, at least in part, on one or more of the objects detected from the image data, the vulnerability determined to be associated with the object, the severity rating determined of the vulnerability, and one or more security options determined for reducing the vulnerability of the object. According to embodiments, the augmented reality display data 138 can include an augmented reality security assistant display including one or more virtual objects generated by the security vulnerability assistant service 124. A virtual object of the augmented reality security assistant display can be overlaid on an image of a display presented by the user device 102 to align with and highlight or otherwise emphasize the object determined to be associated with a vulnerability.

According to embodiments, the augmented reality display data 138 can also include an alert. The alert can include one or more virtual objects generated by the security vulnerability assistant service 124 that can be overlaid on an image of a display presented by the user device 102. The virtual objects of the alert can include text describing the vulnerability detected, a severity rating determined for the vulnerability, and/or any other information corresponding to the vulnerability. Displays presented by the user device 102 can present the alert including the description and/or the severity rating of the vulnerability.

According to embodiments, the augmented reality display data 138 can also include one or more security options determined to reduce the vulnerability. The security options can include one or more virtual objects generated by the security vulnerability assistant service 124 that can be overlaid on an image of a display presented by the user device 102. The virtual objects of the security options can include text describing the security options available for the vulnerability and/or one or more network links corresponding to the security options. Displays presented by the user device 102 can present the security options including the description and/or the corresponding network links. Thus, embodiments of the concepts and technologies described herein can be used to identify vulnerabilities associated with a premises and allow a user to select more accurately security components of a security system needed for optimal protection of the premises.

FIG. 1 illustrates one user device 102, one network 104, one server computer 122, and one datastore 132. It should be understood, however, that various implementations of the operating environment 100 can include zero, one, or more than one user device 102; zero, one, or more than one network 104; zero, one, or more than one server computer 122; or zero, one, or more than one datastore 132. As such, the illustrated embodiment should be understood as being illustrative, and should not be construed as being limiting in any way.

Figure 2A:
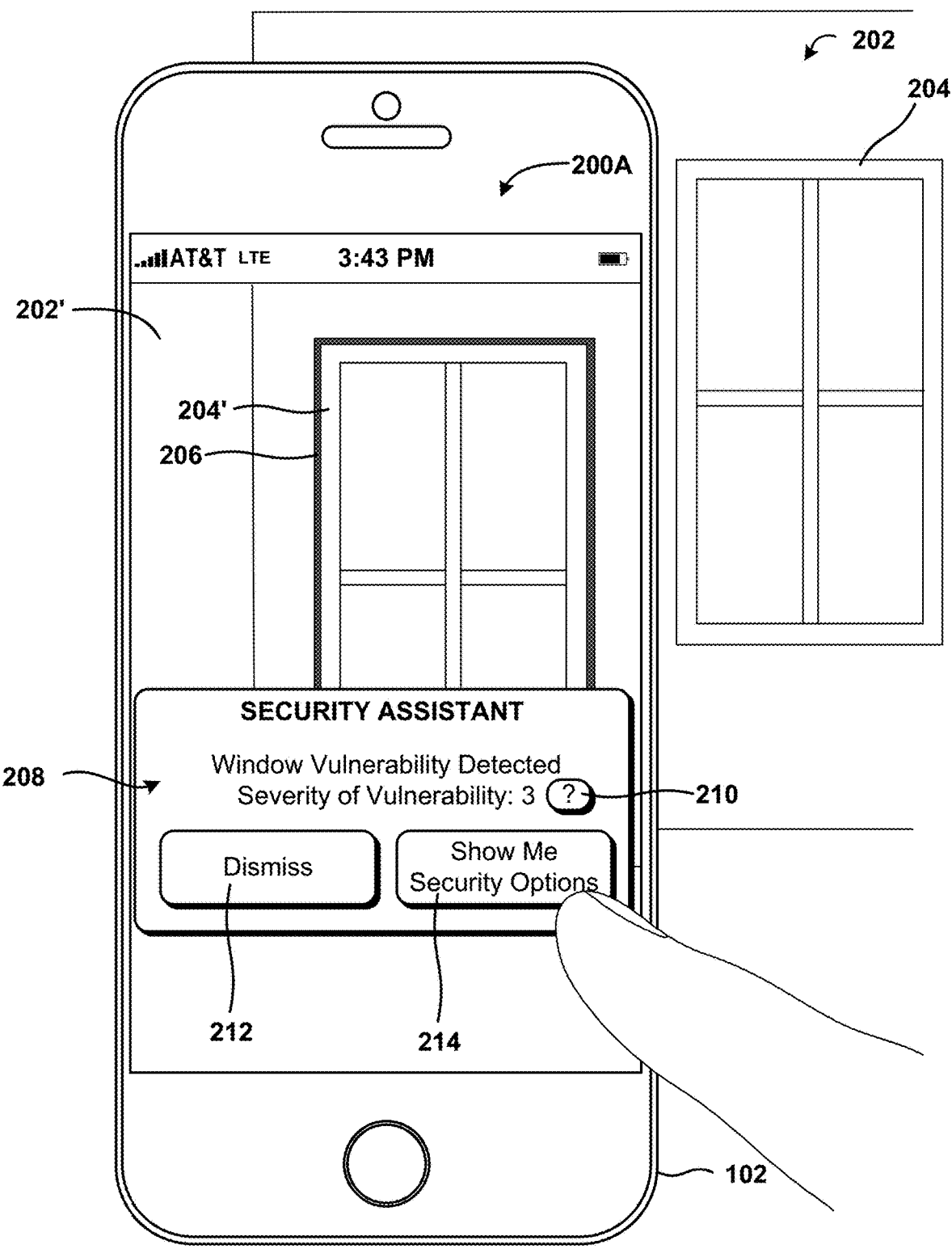
FIGS. 2A-2B are user interface diagrams showing various screen displays for providing augmented reality display data, according to an illustrative embodiment of the concepts and technologies described herein.
Figure 2B:
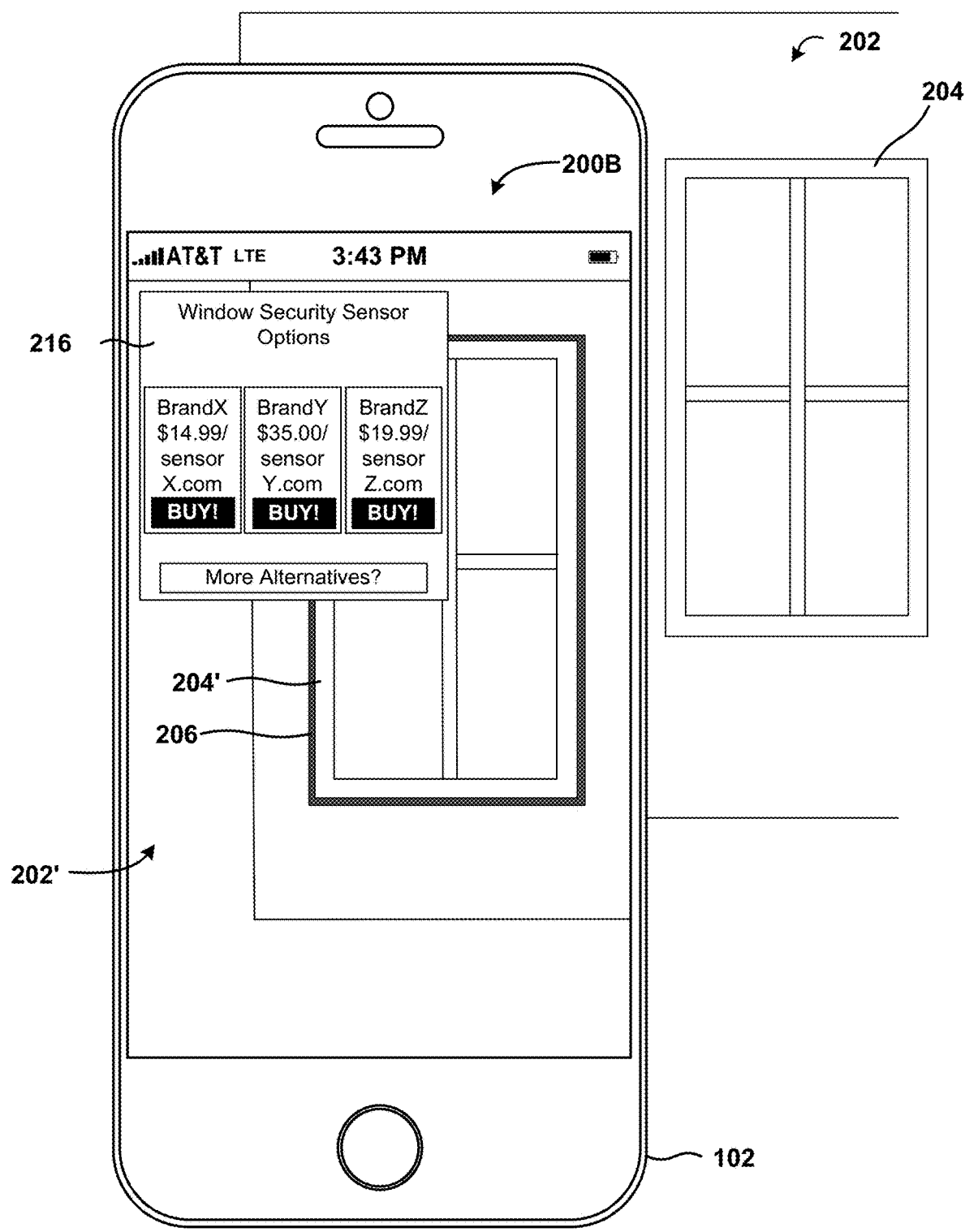

FIGS. 2A-2B show aspects of user interfaces for providing and interacting with functionality associated with the security application 108 and the security vulnerability assistant service 124, according to some illustrative embodiments of the concepts and technologies described herein. FIG. 2A shows an illustrative screen display 200A generated by the user device 102. According to various embodiments, the user device 102 can generate the screen display 200A and/or other screen displays in conjunction with execution of the security application 108 and based on the augmented reality display data 138 received from the security vulnerability assistant service 124. It should be appreciated that the UI illustrated in FIG. 2A is illustrative of one contemplated example of the UIs and therefore should not be construed as being limiting in any way.

The screen display 200A can include an image 202' of a real-world environment 202 captured by the acquisition device 110. According to embodiments, the real-world environment 202 can include an object 204. For example, as illustrated in FIG. 2A, the object 204 can be a window. The image 202' of the screen display 200A can include an image 204' of the object 204. The image 204' of the object 204 is captured in real-time by the acquisition device 110, according to embodiments. The screen display 200A can also include a virtual object 206 of the augmented reality security assistant display of the augmented reality display data 138 received from the security vulnerability assistant service 124. According to embodiments, the virtual object 206 can overlay the image 204' of the object 204 from the real-world environment 202 on the screen display 200A based on the security vulnerability assistant service 124 determining that the object 204, which was included in the image data provided by the user device 102, is associated with a vulnerability. As illustrated in FIG. 2A, the virtual object 206 can comprise a color or embellishment that acts as a highlight around the image 204' of the object 204, which is being captured in real-time by the acquisition device 110, to indicate to the user 114 that a security component should be installed at the object 204 in the real-world environment 202 or installed to monitor the object 204, according to embodiments. Although the virtual object 206 in FIG. 2A is illustrated as a highlight around the image 204', one skilled in the art will understand and appreciate that the virtual object 206 could take other forms such as text, images, texture, patterns, gradients, graphics, videos, animation, combinations thereof, and like, and can be overlaid in other positions in relation to the image 204' of the object 204. For instance, the virtual object 206 may overlay the image 204' of the object 204 and take the form of a video demonstrating how an intruder could take advantage of the vulnerability determined to be associated with the object 204. Thus, the example of the virtual object 206 illustrated in FIG. 2A should not be construed as being limiting in any way.

The screen display 200A can also include a security assistant window 208. The security assistant window 208 can include the alert of the augmented reality display data 138. The security assistant window 208 can overlay the image 202' of the real-world environment 202 on the screen display 200A. As illustrated in FIG. 2A, the security assistant window 208 can indicate that a window vulnerability was detected and provide the severity rating of the vulnerability determined by the security vulnerability assistant service 124, according to embodiments. The security assistant window 208 can also present a UI control 210 associated with the severity rating of the vulnerability that, if selected, causes another window (not shown) to open that provides a description of how the severity rating was determined. For instance, the description may explain that a severity rating of 3 was assigned to the object 204 because the object is a point of entry located at the basement level of the premises 118 and is at least partially hidden from view by some form of landscaping. As discussed above, according to embodiments, the severity rating associated with a particular vulnerability of an object may be based on a location of the object at the premises, a condition of the object, any existing security components associated with the object, and the like. Additionally, the severity rating may be based on the training data of the training data sets 134. It should be understood that this example is illustrative and therefore should not be construed as being limiting in any way.

The security assistant window 208 also can present a UI control 212 to dismiss the security assistant window 208 and a UI control 214 that, if selected, provides a list of security options determined by the security vulnerability assistant service 124 to reduce the vulnerability of the identified object, which in this case is a window. In response to selection of the UI control 212, the user device 102 can update the screen display 200A to hide the security assistant window 208. In response to selection of the UI control 214, the user device 102 can update the screen display 200A to hide the security assistant window 208 and present, via a screen display 200B, an options window 216, as set forth in FIG. 2B. The options window 216 can include the security options of the augmented reality display data 138 determined for the vulnerability and/or network links associated with the security options. The options window 216 can overlay the image 202' of the real-world environment 202 on the screen display 200B. According to embodiments, the options window 216 can present three different brands of window security sensors and a corresponding network link associated with each option that can be selected for accessing additional information about the option and/or for purchasing the option. The options window 216 may also include a UI control that, when selected, provides a list of further options for reducing the vulnerability. Because additional and/or alternative UI controls can be included in the security assistant window 208, it should be understood that these examples are illustrative and therefore should not be construed as being limiting in any way.

Figure 3:
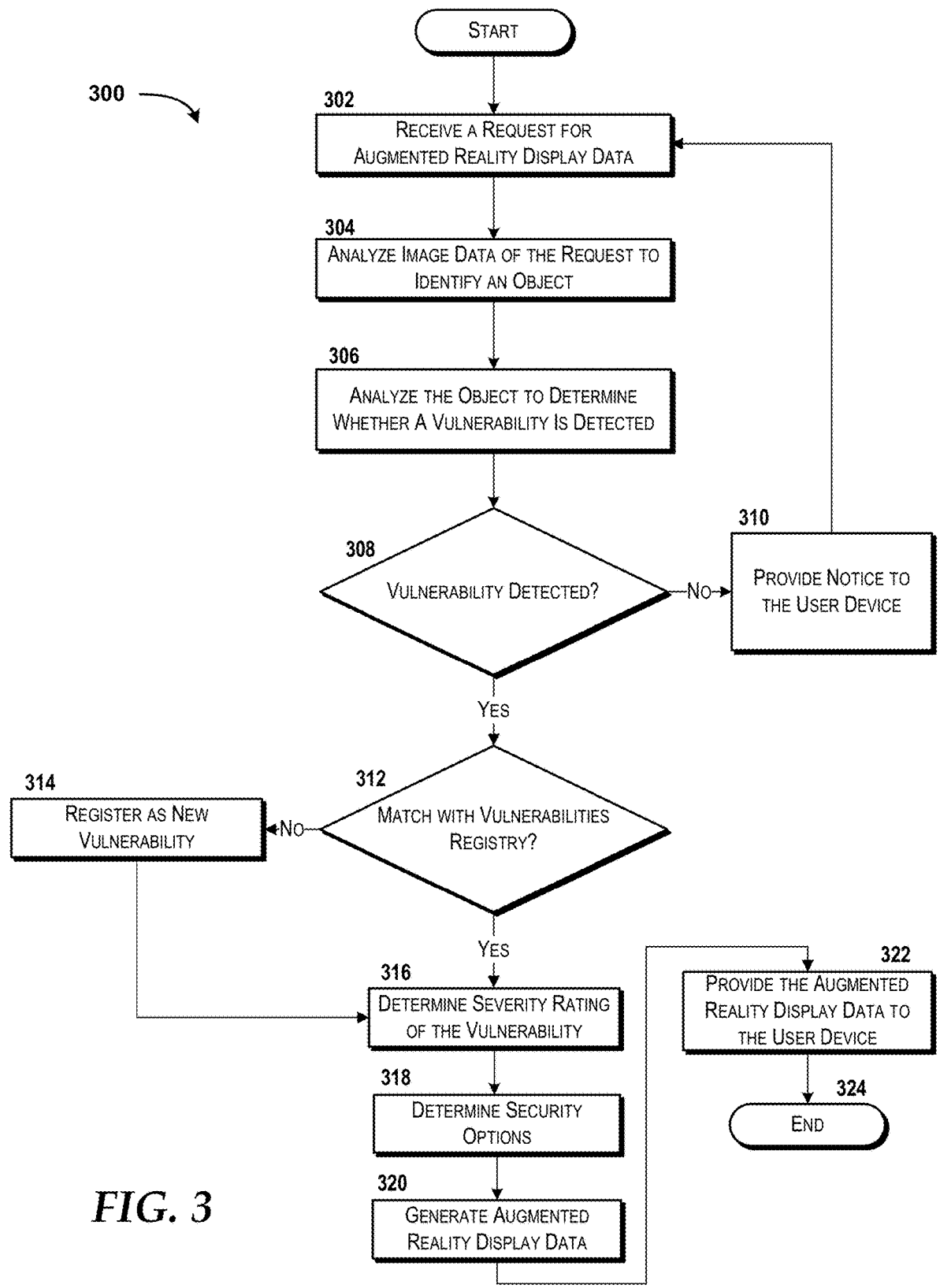
FIG. 3 is a flow diagram showing aspects of a method for generating and providing augmented reality display data, according to an illustrative embodiment of the concepts and technologies described herein.

Turning now to FIG. 3, aspects of a method 300 for generating and providing augmented reality display data will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102 and/or the server computer 122, to perform one or more operations and/or causing the processor to direct other components of the computing system or device to perform one or more of the operations.

For purposes of illustrating and describing the concepts of the present disclosure, the methods disclosed herein are described as being performed by the user device 102 via execution of one or more software modules such as, for example, the security application 108, or the server computer 122 via execution of one or more software modules such as, for example, the security vulnerability assistant service 124. It should be understood that additional and/or alternative devices and/or network nodes can provide the functionality described herein via execution of one or more modules, applications, and/or other software including, but not limited to, the security application 108 and/or the security vulnerability assistant service 124. Thus, the illustrated embodiments are illustrative, and should not be viewed as being limiting in any way.

The method 300 begins at operation 302. At operation 302, the server computer 122 can receive a request, such as the request 120, for augmented reality display data from a user device, such as the user device 102. The request 120 can include image data of a premises, such as the premises 118, captured by the acquisition device 110 of the user device 102 and/or obtained from a surveillance camera associated with an existing security system of the premises 118. According to some embodiments, the request 120 can also include user data. From operation 302, the method 300 proceeds to operation 304, where the security vulnerability assistant service 124 executed by the server computer 122 analyzes the image data of the request 120 to identify one or more objects of the premises 118 captured by the images. As discussed above, the one or more objects of the premises 118 can include doors, windows, fences, garage doors, pet doors, vehicles, storage buildings, stairways, decks, patios, walls, roofs, chimneys, trees, bushes, and/or any other structures of the premises. The security vulnerability assistant service 124 can include an augmented reality security module 126 that can implement an augmented reality algorithm that provides augmented reality-related processing such as object detection, feature extraction, object recognition, template matching, and/or combinations thereof to identify objects of the image data and generate computer data including virtual objects based on the image data. According to some embodiments, machine learning and deep learning are integrated into the augmented reality-related processing provided by the augmented reality security module 126 to facilitate object detection and recognition of the objects of the premises 118 captured by the image data.

From operation 304, the method 300 proceeds to operation 306, where the security vulnerability assistant service 124 analyzes the object identified from the image data of the request 120 to determine whether the object is associated with a vulnerability. According to embodiments, a vulnerability includes any weakness associated with an object that makes it susceptible to intrusion by an unwanted party. As discussed above, according to embodiments, whether or not an object is associated with a vulnerability can be based on one or more of whether the object is an entry point to the premises 118 and if so the type of entry point, a location of the object, a condition of the object, any existing security components associated with the object, and the like. For instance, points of entry, such as doors, windows, pet doors, garage doors, fence gates, and the like, to a premises, such as the premises 118, may be defined as being associated with a vulnerability. The security vulnerability assistant service 124 can use definitions of what constitutes a vulnerability as established by the machine learning models 130 and the user data of the request 120 to determine whether the object identified is associated with a vulnerability.

From operation 306, the method 300 proceeds to operation 308, where the security vulnerability assistant service 124 determines whether, based on the analysis of operation 304, the object is associated with a vulnerability. If a determination is made that the object is not associated with a vulnerability, the method 300 proceeds from operation 308 to operation 310, where a notice may be provided to the user device 102 that the image data provided in the request 120 does not include any objects associated with a vulnerability. From operation 310, the method 300 proceeds to operation 302, where the security vulnerability assistant service 124 monitors for receipt of a further request.

If, back at operation 308, the security vulnerability assistant service 124 determines that the object from the image data is associated with a vulnerability, the method proceeds to operation 312, where a determination is made whether the vulnerability matches vulnerabilities stored in a vulnerabilities registry, such as the vulnerabilities registry 136. If a determination is made that the vulnerability does not match any vulnerabilities stored in the vulnerabilities registry 136, the method proceeds to operation 314, where the vulnerability is stored in the vulnerabilities registry 136. From operation 314, the method proceeds to operation 316. If, at operation 312, a determination is made that the vulnerability is stored in the vulnerabilities registry 136, the method 300 proceeds to operation 314, where the security vulnerability assistant service 124 determines a severity rating associated with the vulnerability associated with the object. As discussed above, the security vulnerability assistant service 124 can use definitions of vulnerability severity established by the machine learning models 130 to determine a severity rating associated with a particular vulnerability (e.g., scale of 1-3 with 1 being a lowest level of vulnerability and 3 being a highest level of vulnerability).

From operation 316, the method proceeds to operation 318, where the security vulnerability assistant service 124 determines one or more security options that could be used to reduce the vulnerability of the object. For instance, security vulnerability assistant service 124 may determine that installation of security components such as one or more motion sensors, indoor and outdoor cameras, glass break detectors, door and window sensors, smoke detectors, carbon monoxide detectors, combinations thereof, or the like would reduce the vulnerability of the object identified from the image data. The security vulnerability assistant service 124 can use relationships between vulnerabilities and security components established by the machine learning models 130 to determine a security component to recommend based on a vulnerability associated with an object.

From operation 318, the method 300 proceeds to operation 320, where the security vulnerability assistant service 124 can generate an augmented reality display data, such as the augmented reality display data 138, based, at least in part, on one or more of the objects detected from the image data, the vulnerability determined to be associated with the object, the severity rating determined for the vulnerability, and one or more security options for reducing the vulnerability of the object. According to embodiments, the augmented reality display data 138 can include an augmented reality security assistant display including one or more virtual objects generated by the security vulnerability assistant service 124. A virtual object of the augmented reality security assistant display can be overlaid on an image of a display presented by the user device 102 to align with and highlight or otherwise emphasize the object determined to be associated with a vulnerability. According to embodiments, the augmented reality display data 138 can also include an alert including a severity rating determined for the vulnerability. Displays presented by the user device 102 can present the alert including the severity rating of the vulnerability. Additionally, the augmented reality display data 138 can include one or more security options determined to reduce the vulnerability. Displays presented by the user device 102 can also provide security options for reducing the vulnerability of the object.

From operation 320, the method 300 proceeds to operation 322, where the server computer 122 provides the augmented reality display data 138 to the user device 102. From operation 322, the method 300 proceeds to operation 324, where the method 300 ends.

Figure 4:
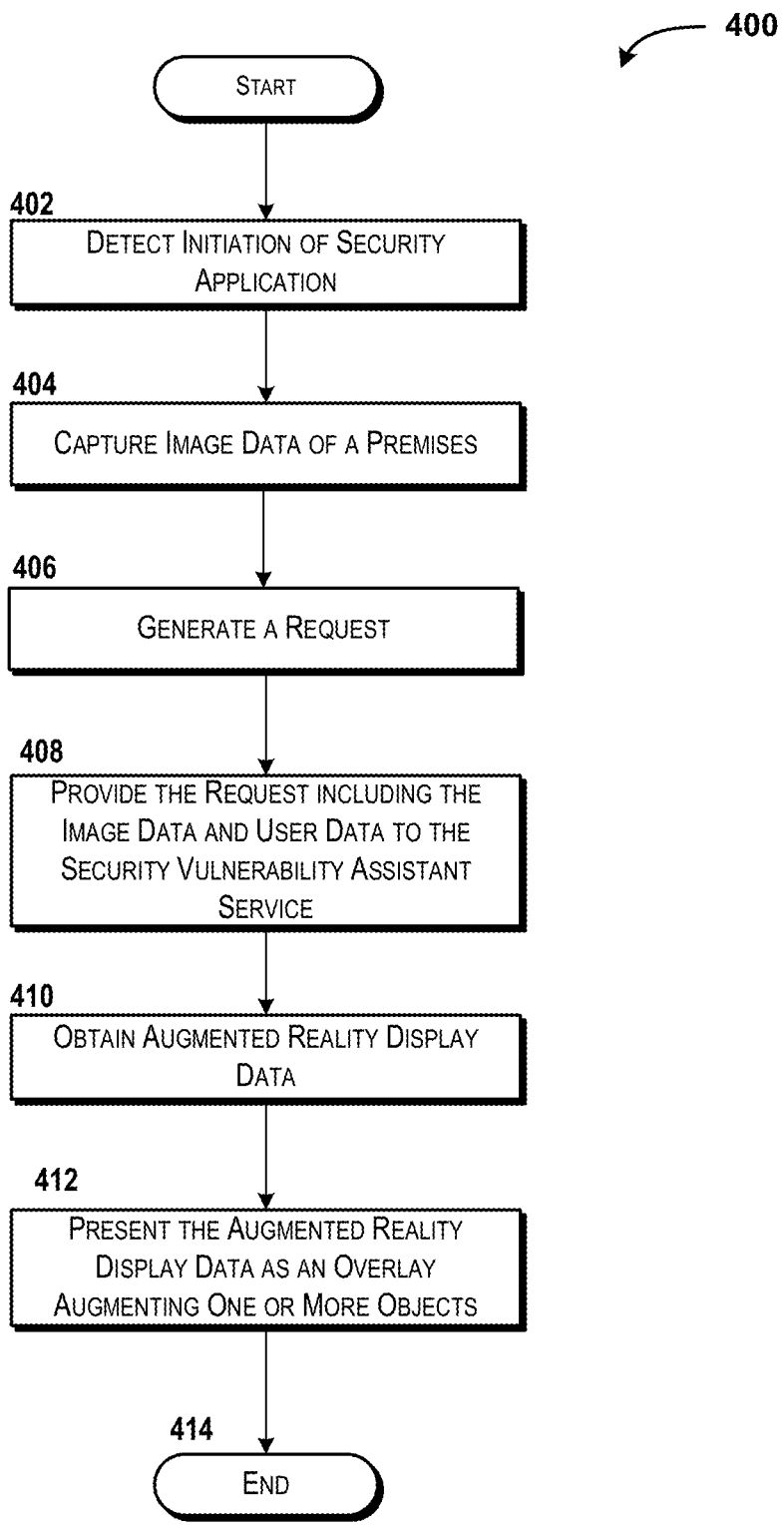
FIG. 4 is a flow diagram showing aspects of a method for requesting and presenting augmented reality display data, according to an illustrative embodiment of the concepts and technologies described herein.

Turning now to FIG. 4, a method 400 for requesting and presenting augmented reality display data will be described, according to an illustrative embodiment. The method begins at operation 402, where a security application 108 executing on a user device, such as the user device 102, is launched or otherwise initiated. From operation 402, the method 400 proceeds to operation 404, where the user device 102, via execution of the security application 108, can provide a live view of a physical, real-world environment, such as the real-world environment 116, in response to initiation of the security application 108. As discussed above, the user device 102 may utilize the acquisition device 110 to capture a live view of the physical, real-world environment 116, which can then be presented to the user 114 via the display 112 of the user device 102. According to embodiments, the security application 108 can be configured to instruct a user, such as the user 114, to use the user device 102 to scan a premises, such as the premises 118, for which the user 114 would like to install a security system and/or upgrade/supplement an existing security system. The premises 118 can be any location, building, structure, property, grounds, or the like for which the user 114 would like to install a security system and/or upgrade/supplement an existing security system. At least a portion of the premises 118 can be presented on the display 112 of the user device 102 as image data that, as described further herein, can be used for augmentation. The user device 102, via execution of the security application 108, can also be configured to obtain user data including one or more of orientation data, existing security system information, known vulnerabilities/incidents data associated with the premises 118 known by the user 114, other data (not illustrated separately in FIG. 1), combinations thereof, or the like, as discussed above.

From operation 404, the method 400 proceeds to operation 406, where the user device 102, via execution of the security application 108, can generate a request, such as the request 120, for augmented reality display data. The request 120 can include the image data captured by the acquisition device 110. According to some embodiments, the request 120 can also include the various data included in the user data. According to various embodiments, including the embodiment shown in FIG. 1, the security application 108 can communicate with a security vulnerability assistant service 124 or other software that may be hosted or executed by a computing device. In the illustrated embodiment, the security vulnerability assistant service 124 can be a callable service that may be hosted by a server computer 122. Because the security vulnerability assistant service 124 can be invoked, accessed, and/or interacted with in manners other than service calls or the like, it should be understood that the functionality of the server computer 122 may be provided by other computing devices such as laptop computers, workstations, web servers, combinations thereof, or the like. As such, it should be understood that this example is illustrative and therefore should not be construed as being limiting in any way. From operation 406, the method 400 proceeds to operation 408, where the user device 102 provides the request 120 to the security vulnerability assistant service 124.

From operation 408, the method 400 proceeds to operation 410, where the user device receives, from the server computer 122, augmented reality display data, such as the augmented reality display data 138. According to embodiments, the augmented reality display data 138 can include an augmented reality security assistant display, security options, and an alert. From operation 410, the method 400 proceeds to operation 412, where the user device 102 present the augmented reality display data 138. For instance, a virtual object of the augmented reality security assistant display of the augmented reality display data 138 can be overlaid on an image of a display presented by the user device 102 to align with and highlight or otherwise emphasize the object determined to be associated with a vulnerability. According to embodiments, the augmented reality display data 138 can also include the alert of the augmented reality display data 138 including a severity rating determined for the vulnerability. Displays presented by the user device 102 can present the alert including the severity rating of the vulnerability. Additionally, the augmented reality display data 138 can include one or more of the security options determined to reduce the vulnerability. Displays presented by the user device 102 can also provide security options for reducing the vulnerability of the object. Thus, embodiments of the concepts and technologies described herein can be used to identify vulnerabilities associated with a premises and allow a user to select more accurately and install security components needed for optimal protection of the premises. From operation 412, the method 400 proceeds to operation 414, where the method 400 ends.

Figure 5:
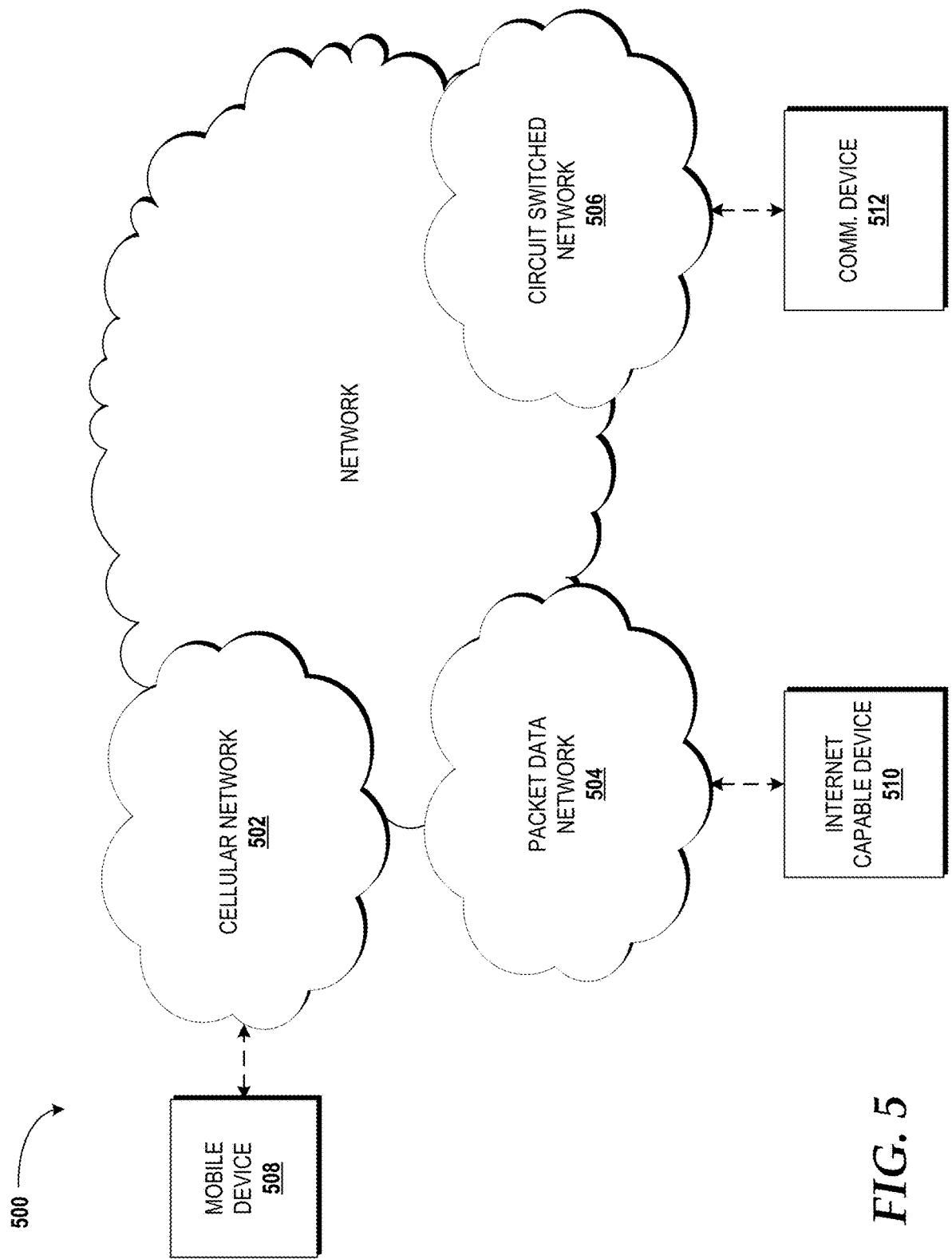
FIG. 5 schematically illustrates a network, according to an illustrative embodiment of the concepts and technologies described herein.

Turning now to FIG. 5, details of a network 500 are illustrated, according to an illustrative embodiment. In some embodiments, the network 500 can include the network 104. The network 500 includes a cellular network 502, a packet data network 504, for example, the Internet, and a circuit switched network 506, for example, a PSTN. The cellular network 502 includes various network components such as, but not limited to, base transceiver stations ("BTSs"), NBs or eNBs, base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), HSSs, VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. In some embodiments, the user device 102 can be configured as the mobile communication device 508. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards such as LTE, or the like, as well as evolved and future mobile standards, such as LTE-U.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. In some embodiments, the network 104 can be configured as a packet data network, such as the packet data network 504. The circuit switched network 506 includes various hardware and software for providing circuit switched communications. The circuit switched network 506 may include, or may be, what is often referred to as a POTS. In some embodiments, the network 104 also can be configured as a circuit switched network, such as the circuit switched network 506. The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network of FIG. 5 is used to refer broadly to any combination of the networks 502, 504, 506 shown in FIG. 5. It should be appreciated that, in some embodiments, substantially all of the functionality described with reference to the network 104 can be performed by the cellular network 502, the packet data network 504, and/or the circuit switched network 506, alone or in combination with other networks, network elements, and the like, according at least to aspects of the features and operations discussed herein.

Figure 6:
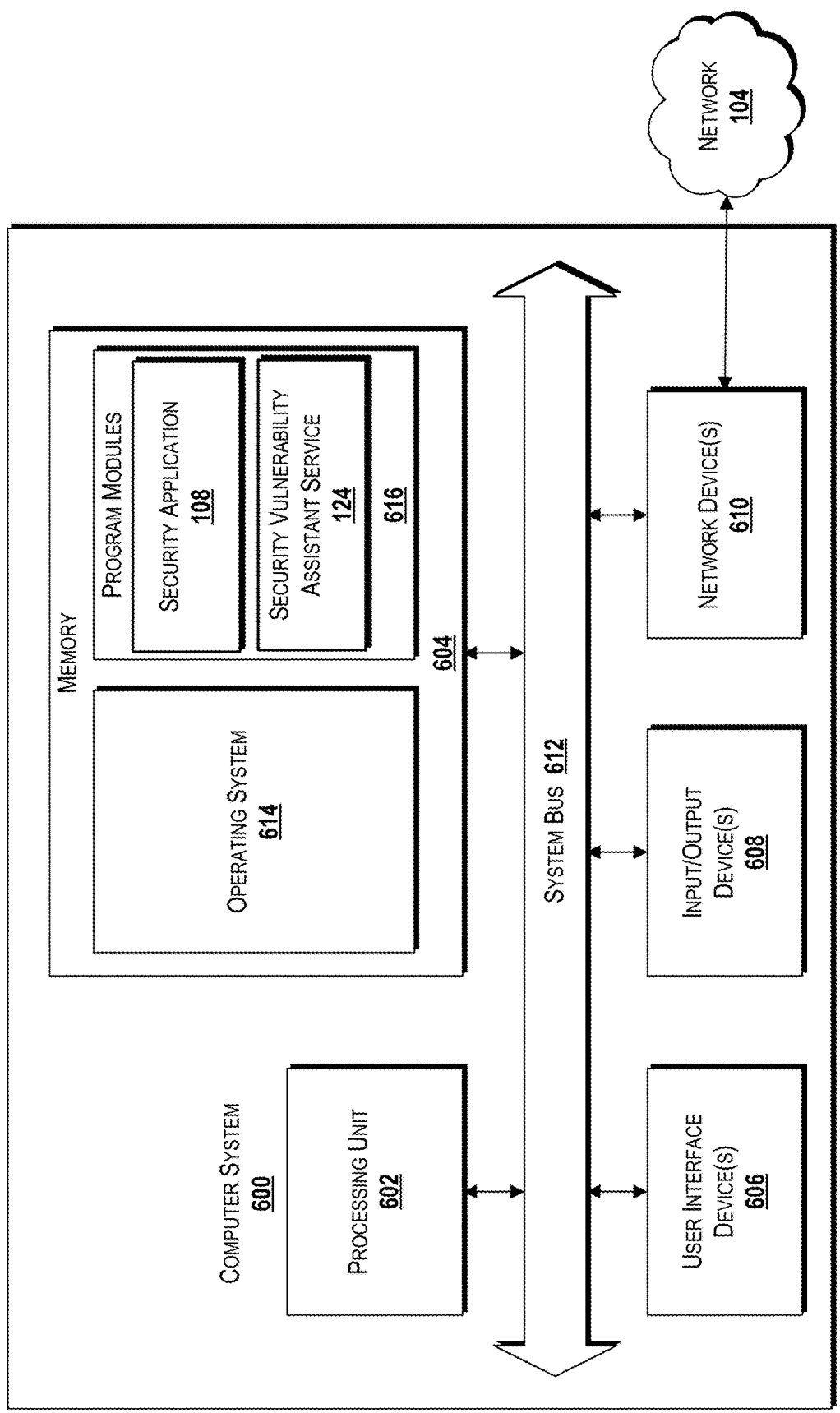
FIG. 6 is a block diagram illustrating an example computer system configured to generate data for providing augmented reality security assistant displays, according to some illustrative embodiments of the concepts and technologies described herein.

Turning now to FIG. 6 is a block diagram illustrating a computer system 600 configured to provide the functionality in accordance with various embodiments of the concepts and technologies disclosed herein. The systems, devices, and other components disclosed herein can utilize, at least in part, an architecture that is the same as or at least similar to the architecture of the computer system 600. In some embodiments, one or more of the user device 102, the server computer 122, and/or the datastore 132 can be configured like the computer system 600. It should be understood, however, that modification to the architecture may be made to facilitate certain interactions among elements described herein.

The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The illustrated memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 616 may include various software and/or program modules to perform the various operations described herein. In some embodiments, for example, the program modules 616 can include the security application 108, the security vulnerability service 124, the augmented reality security module 126, the vulnerability detection module 128, the machine learning models 130, and/or other program modules. These and/or other programs can be embodied in computer-readable media containing instructions that, when executed by the processing unit 602, in some embodiments, may perform and/or facilitate performance of one or more of the method 300 described in detail above with respect to FIG. 3 and method 400 described in detail above with respect to FIG. 4. According to some embodiments, the program modules 616 may be embodied in hardware, software, firmware, or any combination thereof. Although not shown in FIG. 6, it should be understood that the memory 604 also can be configured to store the training data sets 134, the vulnerabilities registry 136, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, PDAs, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer. In some embodiments, the I/O devices 608 can be used for manual controls for operations to exercise under certain emergency situations.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 104 may be or may include a wired network such as, but not limited to, a Wide Area Network ("WAN"), a wired Personal Area Network ("PAN"), a wired Metropolitan Area Network ("MAN"), a VoIP network, an IP/MPLS network, a PSTN network, an IMS network, an EPC network, or any other mobile network and/or wireline network.

Figure 7:
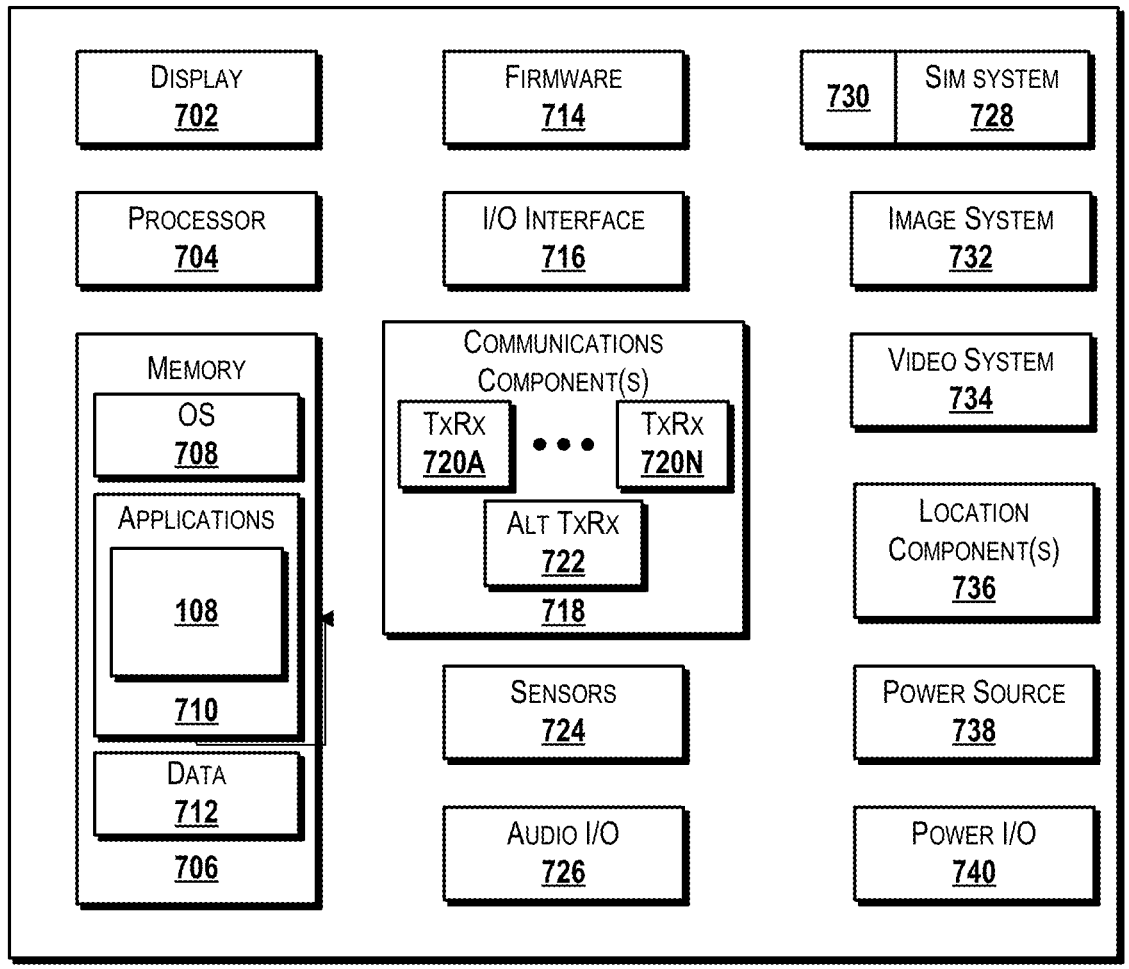
FIG. 7 is a block diagram illustrating an example mobile device configured to interact with a security vulnerability assistant service to provide augmented reality security assistant displays, according to some illustrative embodiments of the concepts and technologies described herein.

Turning now to FIG. 7, an illustrative mobile device 700 and components thereof will be described. In some embodiments, the user device 102 (shown in FIG. 1) can be configured like the mobile device 700. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. In some embodiments, the display 112 can be configured like the display 702. According to various embodiments, the display 702 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710, other computer-executable instructions stored in a memory 706, or the like. The operating system 106 can be configured like the operating system 708, and the security application 108 can be configured like the applications 710. In some embodiments, the applications 710 also can include a user interface ("UI") application (not illustrated in FIG. 5).

The UI application can interface with the operating system 708 to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, launching the security application 108, capturing an image via the acquisition device 110, viewing the augmented reality display data 138, entering/deleting data, entering and setting local credentials (e.g., user IDs and passwords) for device access, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, one or more identifiers, and/or other applications or program modules. According to various embodiments, the applications 710 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, user information, organization information, presence status information, user IDs, passwords, and application initiation (start-up) requests. In some embodiments, the I/O interface 716 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RHO port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, and greater generation technology standards. Moreover, the communications component 718 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 718 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-720N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein. The acquisition device 110 can be configured like the image system 732 and/or the video system 734.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Turning now to FIG. 8, the machine learning system 800 capable of implementing aspects of the embodiments disclosed herein will be described. The machine learning system 800 can be used to train the machine learning models 130. Accordingly, the server computer 122 can include the machine learning system 800 or can be in communication with the machine learning system 800.

The illustrated machine learning system 800 includes one or more machine learning models 802, such the machine learning models 130. The machine learning models 802 can include, unsupervised, supervised, and/or semi-supervised learning models. The machine learning model(s) 802 can be created by the machine learning system 800 based upon one or more machine learning algorithms 804. The machine learning algorithm(s) 804 can be any existing, well-known algorithm, any proprietary algorithms, or any future machine learning algorithm. Some example machine learning algorithms 804 include, but are not limited to, neural networks, gradient descent, linear regression, logistic regression, linear discriminant analysis, decision trees, Naive Bayes, K-nearest neighbor, learning vector quantization, support vector machines, principal component analysis, and the like. Classification and regression algorithms might find particular applicability to the concepts and technologies disclosed herein. Those skilled in the art will appreciate the applicability of various machine learning algorithms 804 based upon the problem(s) to be solved by machine learning via the machine learning system 800.

The machine learning system 800 can control the creation of the machine learning models 802 via one or more training parameters. In some embodiments, the training parameters are selected variables or factors at the direction of an enterprise, for example. Alternatively, in some embodiments, the training parameters are automatically selected based upon data provided in one or more training data sets 806, such as the training data sets 134. The training parameters can include, for example, a learning rate where relevant such as when a classification algorithm is utilized, a model size, a number of training passes, data shuffling, regularization, and/or other training parameters known to those skilled in the art. The training data in the training data sets 806 can include vulnerability data, incident data, community data, and historical data. According to embodiments, the vulnerability, incident, community, and historical data can include, but should not be limited to, information about vulnerabilities identified by others, such as other owners/leasers of premises within and/or outside of the geographic location of the user device 102, security system professionals, building inspectors, exterminators, and the like; information about incidents, such as burglaries, trespasses, and animal invasions, experienced and/or reported by others within and/or outside of the geographic location of the user device 102; security component options selected by others; combinations thereof; and the like.

The learning rate is a training parameter defined by a constant value. The learning rate affects the speed at which the machine learning algorithm 804 converges to the optimal weights. The machine learning algorithm 804 can update the weights for every data example included in the training data sets 806. The size of an update is controlled by the learning rate. A learning rate that is too high might prevent the machine learning algorithm 804 from converging to the optimal weights. A learning rate that is too low might result in the machine learning algorithm 804 requiring multiple training passes to converge to the optimal weights.

The model size is regulated by the number of input features ("features") 808 in the training data sets 806. The training data sets 806 and evaluation data sets 810 discussed further below may be selected based on an appropriate training/test split for training and evaluation, such as an 80/20 split.

The number of training passes indicates the number of training passes that the machine learning algorithm 804 makes over the training data sets 806 during the training process. The number of training passes can be adjusted based, for example, on the size of the training data sets 806, with larger training data sets being exposed to fewer training passes in consideration of time and/or resource utilization. The performance of the resultant machine learning model 802 can be increased by multiple training passes.

Data shuffling is a training parameter designed to prevent the machine learning algorithm 804 from reaching false optimal weights due to the order in which data contained in the training data sets 806 is processed. For example, data provided in rows and columns might be analyzed first row, second row, third row, etc., and thus an optimal weight might be obtained well before a full range of data has been considered. By data shuffling, the data contained in the training data sets 806 can be analyzed more thoroughly and mitigate bias in the resultant machine learning model 802.

Regularization is a training parameter that helps to prevent the machine learning model 802 from memorizing training data from the training data sets 806. In other words, the machine learning model 802 fits the training data sets 806, but the predictive performance of the machine learning model 802 is not acceptable. Regularization helps the machine learning system 800 avoid this overfitting/memorization problem by adjusting extreme weight values of the features 808. For example, a feature that has a small weight value relative to the weight values of the other features in the training data sets 806 can be adjusted to zero.

The machine learning system 800 can determine model accuracy after training by using the training data sets 806 with some of the features 808 and testing the machine learning model 802 with unseen evaluation data sets 810 containing the same features 808' in the training data sets 806. This also prevents the machine learning model 802 from simply memorizing the data contained in the training data sets 806. The number of evaluation passes made by the machine learning system 800 can be regulated by a target model accuracy that, when reached, ends the evaluation process and the machine learning model 802 is considered ready for deployment.

After deployment, the machine learning model 802 can perform a prediction operation ("prediction") 814 with an input data set 812 having the same features 808" as the features 808 in the training data sets 806 and the features 808' of the evaluation data sets 810. The results of the prediction 814 are included in an output data set 816 consisting of predicted data. The machine learning model 802 can perform other operations, such as regression, classification, and others. As such, the example illustrated in FIG. 8 should not be construed as being limiting in any way.

Based on the foregoing, it should be appreciated that concepts and technologies directed to identifying vulnerabilities associated with a premises and generating and/or presenting augmented reality security assistant displays to aid in selecting security components to protect the vulnerabilities identified have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
receiving, by a server computer comprising a processor executing a security vulnerability assistant service, a request from a user device, wherein the request comprises image data of a premises and user data comprising existing security system information associated with the premises;
identifying, by the server computer, an object captured by the image data;
determining, by the server computer, whether the object captured by the image data is associated with a vulnerability based, at least in part, on the existing security system information associated with the premises, wherein the existing security system information indicates whether the object captured by the image data is associated with an existing security component comprising at least one of a glass break detector, a door sensor, or a window sensor; and
in response to determining that the object captured by the image data is associated with a vulnerability, generating, by the server computer, augmented reality display data, wherein the augmented reality display data comprises a virtual object for overlaying on an image of the object presented by the user device, and wherein the virtual object comprises a video demonstrating an intruder exploiting the vulnerability associated with the object.

2. The method of claim 1, further comprising providing the augmented reality display data to the user device for presentation by the user device.

3. The method of claim 1, wherein the virtual object further comprises at least one of text, a color, a pattern, a gradient, a graphic, or an animation that highlights the image of the object.

4. The method of claim 1, further comprising determining a severity rating associated with the vulnerability, wherein the augmented reality display data further comprises a virtual object corresponding to the severity rating for overlaying on an image of the premises presented by the user device.

5. The method of claim 1, further comprising determining an option for reducing the vulnerability associated with the object, wherein the augmented reality display data further comprises a virtual object corresponding to the option for overlaying on an image of the premises presented by the user device.

6. The method of claim 1, wherein the user data further comprises at least one of orientation data associated with the user device or incident data associated with the premises.

7. A system comprising:
a processor; and
a memory comprising computer-executable instructions that, when executed by the processor, cause the processor to perform operations comprising
receiving a request from a user device, wherein the request comprises image data of a premises and user data comprising existing security system information associated with the premises;
identifying an object captured by the image data;
determining whether the object captured by the image data is associated with a vulnerability based, at least in part, on the existing security system information associated with the premises, wherein the existing security system information indicates whether the object captured by the image data is associated with an existing security component comprising at least one of a glass break detector, a door sensor, or a window sensor; and
in response to determining that the object captured by the image data is associated with a vulnerability, generating augmented reality display data, wherein the augmented reality display data comprises a virtual object for overlaying on an image of the object presented by the user device, and wherein the virtual object comprises a video demonstrating an intruder exploiting the vulnerability associated with the object.

8. The system of claim 7, wherein the operations further comprise providing the augmented reality display data to the user device for presentation by the user device.

9. The system of claim 7, wherein the virtual object further comprises at least one of text, a color, a pattern, a gradient, a graphic, or an animation that highlights the image of the object.

10. The system of claim 7, wherein the operations further comprise determining a severity rating associated with the vulnerability, wherein the augmented reality display data further comprises a virtual object corresponding to the severity rating for overlaying on an image of the premises presented by the user device.

11. The system of claim 7, wherein the operations further comprise an option for reducing the vulnerability associated with the object, wherein the augmented reality display data further comprises a virtual object corresponding to the option for overlaying on an image of the premises presented by the user device.

12. The system of claim 7, wherein the user data further comprises at least one of orientation data associated with the user device or incident data associated with the premises.

13. A computer-readable storage medium comprising computer-executable instructions that, when executed by a processor, cause the processor to perform operations comprising:
receiving a request from a user device, wherein the request comprises image data of a premises and user data comprising existing security system information associated with the premises;
identifying an object captured by the image data;
determining whether the object captured by the image data is associated with a vulnerability based, at least in part, on the existing security system information associated with the premises, wherein the existing security system information indicates whether the object captured by the image data is associated with an existing security component comprising at least one of a glass break detector, a door sensor, or a window sensor; and in response to determining that the object captured by the image data is associated with a vulnerability, generating augmented reality display data, wherein the augmented reality display data comprises a virtual object for overlaying on an image of the object presented by the user device, and wherein the virtual object comprises a video demonstrating an intruder exploiting the vulnerability associated with the object.

14. The computer-readable storage medium of claim 13, wherein the operations further comprise providing the augmented reality display data to the user device for presentation by the user device.

15. The computer-readable storage medium of claim 13, wherein the virtual object further comprises at least one of text, a color, a pattern, a gradient, a graphic, or an animation that highlights the image of the object.

16. The computer-readable storage medium of claim 13, wherein the operations further comprise determining a severity rating associated with the vulnerability, wherein the augmented reality display data further comprises a virtual object corresponding to the severity rating for overlaying on an image of the premises presented by the user device.

17. The computer-readable storage medium of claim 13, wherein the operations further comprise determining an option for reducing the vulnerability associated with the object, wherein the augmented reality display data further comprises a virtual object corresponding to the option for overlaying on an image of the premises presented by the user device.

18. The computer-readable storage medium of claim 13, wherein the user data further comprises at least one of orientation data associated with the user device or incident data associated with the premises.

\* \* \* \* \*